US008725971B2

(12) United States Patent
Nakamura et al.

(10) Patent No.: US 8,725,971 B2
(45) Date of Patent: May 13, 2014

(54) STORAGE APPARATUS AND METHOD FOR CONTROLLING STORAGE APPARATUS INVOLVING SNAPSHOTS

(75) Inventors: Yasuaki Nakamura, Fujisawa (JP); Tomohiko Suzuki, Odawara (JP); Tetsuya Abe, Hiratsuka (JP); Akemi Sanada, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/394,045

(22) PCT Filed: Feb. 20, 2012

(86) PCT No.: PCT/JP2012/001103
§ 371 (c)(1),
(2), (4) Date: Mar. 2, 2012

(87) PCT Pub. No.: WO2013/124876
PCT Pub. Date: Aug. 29, 2013

(65) Prior Publication Data
US 2013/0219136 A1 Aug. 22, 2013

(51) Int. Cl.
*G06F 13/00* (2006.01)
(52) U.S. Cl.
USPC .................................. 711/162; 711/E12.017
(58) Field of Classification Search
None
See application file for complete search history.

(56) References Cited

U.S. PATENT DOCUMENTS

| 7,469,289 | B2* | 12/2008 | Arakawa et al. ............... 709/224 |
| 7,631,023 | B1* | 12/2009 | Kaiser et al. ........................... 1/1 |
| 2003/0093619 | A1 | 5/2003 | Sugino et al. |
| 2009/0019251 | A1* | 1/2009 | Helman et al. ................ 711/171 |
| 2009/0172039 | A1* | 7/2009 | Honami et al. ............... 707/200 |
| 2011/0088029 | A1 | 4/2011 | Murase |
| 2011/0231172 | A1* | 9/2011 | Gold ............................... 703/13 |
| 2012/0060078 | A1* | 3/2012 | Beauchamp et al. ......... 715/201 |
| 2012/0131291 | A1* | 5/2012 | Gangalwar et al. ........... 711/162 |
| 2012/0272021 | A1* | 10/2012 | Okada et al. .................... 711/162 |

OTHER PUBLICATIONS

PCT International Search Report and Written Opinion on application PCT/JP2012/001103 mailed Aug. 6, 2012; 9 pages.

* cited by examiner

*Primary Examiner* — Sean D Rossiter
(74) *Attorney, Agent, or Firm* — Foley & Lardner LLP

(57) ABSTRACT

A drop in the access performance to a source volume is prevented by executing various control methods according to the snapshot usage method. A storage apparatus comprises one or more storage devices which provide storage areas; and a controller which creates a logical volume in the storage area provided by the one or more storage devices, and which reads and writes data from/to the logical volume according to a request from a host, wherein the controller acquires one or more snapshots which are data images at certain time points of the logical volume, wherein the controller determines whether the logical volume is subject to abrupt load fluctuations on the basis of performance information of the logical volume and the snapshots, and wherein, if the logical volume is subject to abrupt load fluctuations, the controller executes predetermined control processing according to usage cases of the snapshots.

9 Claims, 20 Drawing Sheets

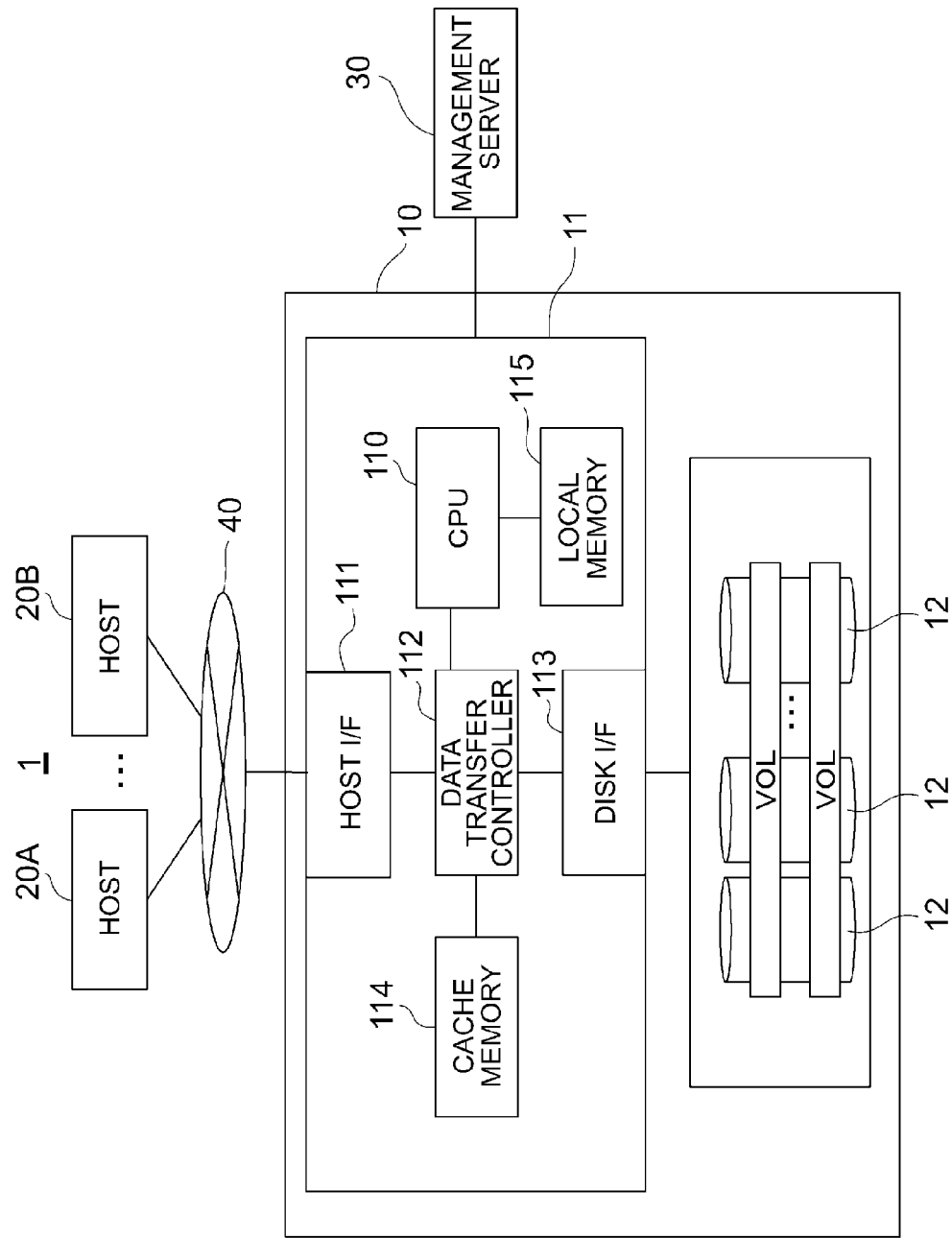

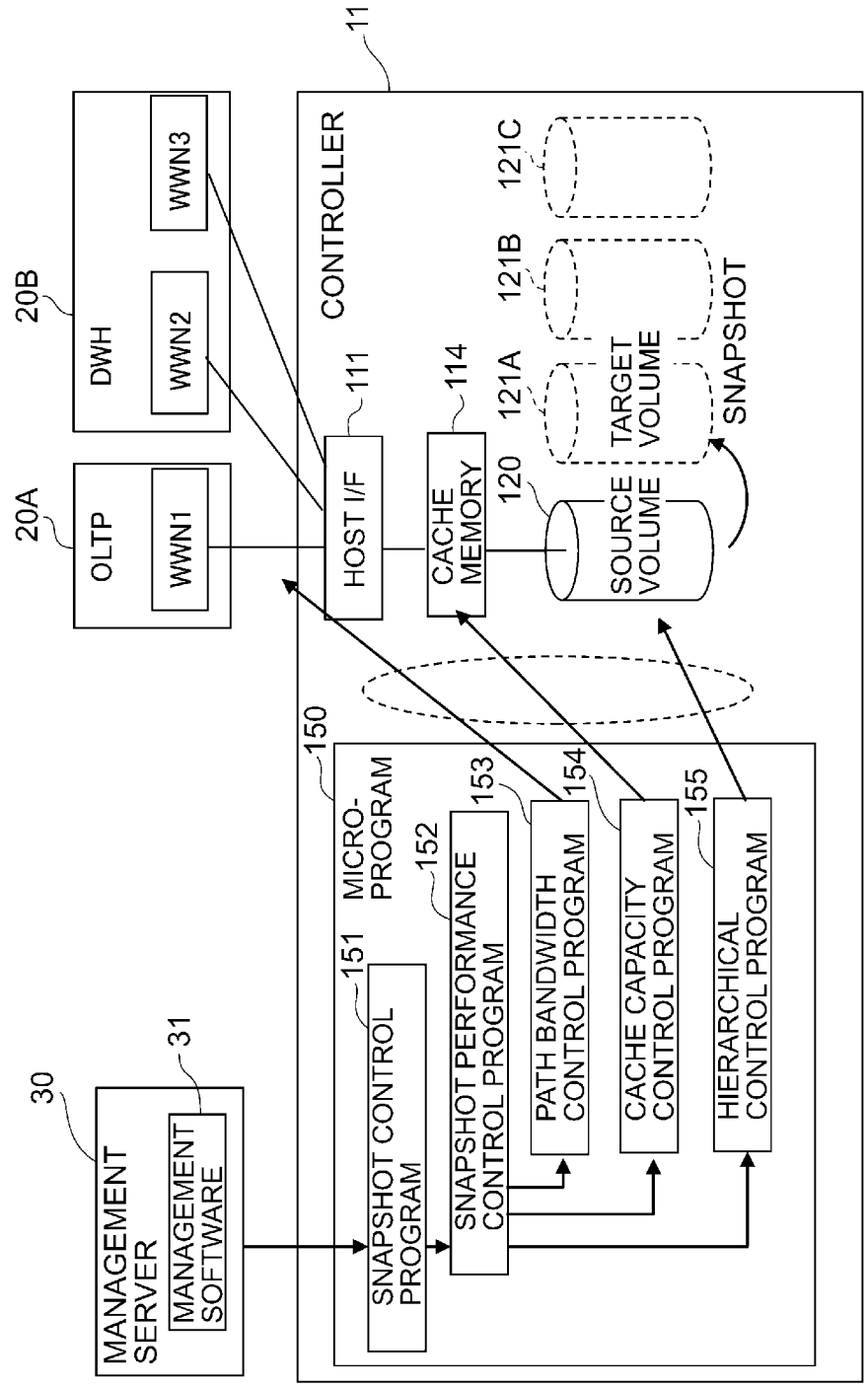

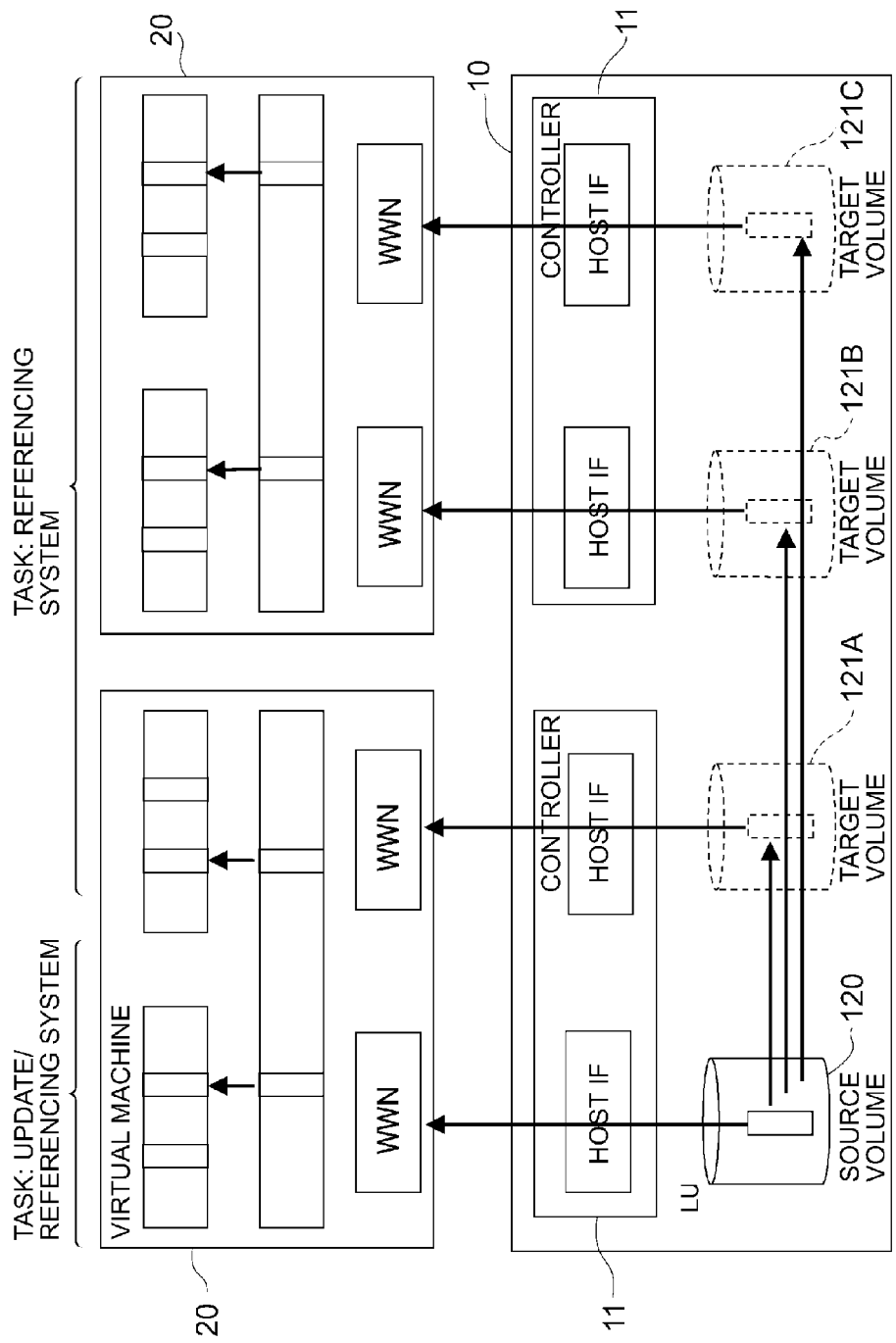

FIG. 4

| USAGE CASE | TEST | BATCH | NEAR CDP | DWH | VM CLONE |
|---|---|---|---|---|---|
| SOURCE VOL | OLTP | OLTP | OLTP | OLTP | MASTER |
| PRIMARY/SECONDARY SIMULTANEOUS USAGE | YES | YES | NO | NO | YES |
| TARGET VOL ACCESS CHARACTERISTIC | SITE LOCALIZATION | SITE AND TIME LOCALIZATION | SITE LOCALIZATION | ALL DATA ACCESS | ALL DATA ACCESS |
| PRIORITY | YES | YES | YES | YES | NO |
| BANDWIDTH LIMIT | REQUIRED | REQUIRED | NOT REQUIRED | REQUIRED | REQUIRED |
| HIERARCHICAL CONTROL REQUIREMENT | REQUIRED | NOT REQUIRED | NOT REQUIRED | REQUIRED | REQUIRED |
| MIGRATION CLASS | BLOCK | BLOCK | NONE | VOLUME | VOLUME |
| CACHE CAPACITY LIMIT | NOT REQUIRED | NOT REQUIRED | NOT REQUIRED | REQUIRED | REQUIRED |

| VOL NAME | WWN | HOST IF | CONTROLLER | LU |
|---|---|---|---|---|
| SOURCE | WWN1 | HOST IF1 | CONTROLLER1 | LU1 |
| TARGET1 | WWN2 | HOST IF2 | CONTROLLER1 | LU2 |
| ... | | | | |
| TARGETn | WWNn | HOST IFn | CONTROLLERn | LUn |

WWN1

| TIME | IOPS |
|---|---|
| 00:00:00 | 0 |
| 00:01:00 | 300 |
| ... | |
| 00:0n:00 | 100 |

1811    1812

181

FIG.14
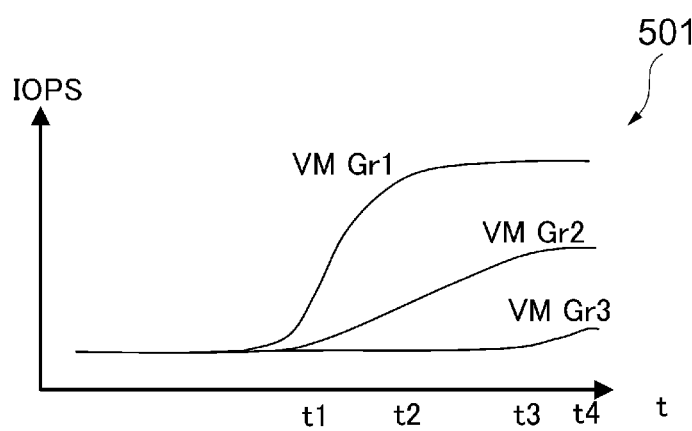
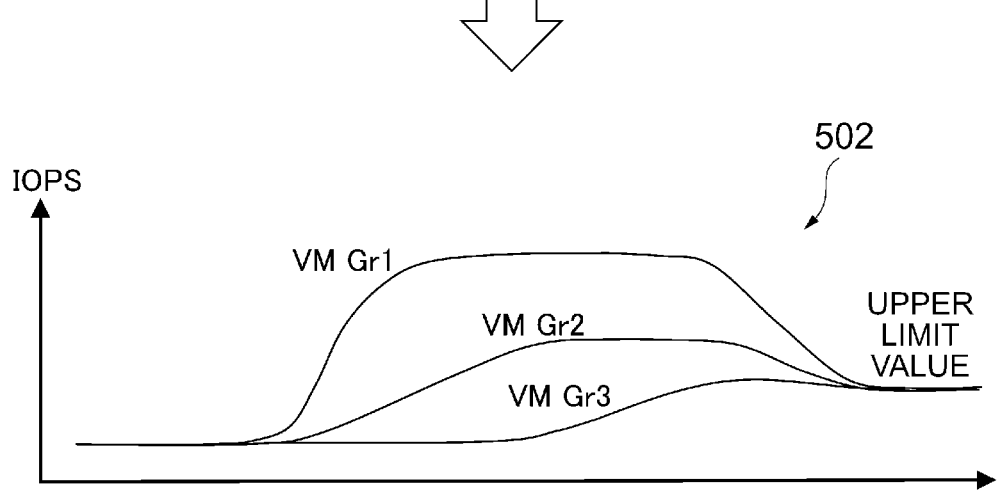

STORAGE APPARATUS AND METHOD FOR CONTROLLING STORAGE APPARATUS INVOLVING SNAPSHOTS

TECHNICAL FIELD

The present invention relates to a storage apparatus and a method for controlling the storage apparatus and is suitably applied to a storage apparatus in which a snapshot function is installed and a method for controlling the storage apparatus.

BACKGROUND ART

Conventionally, as one function of a disk array device, there exists a so-called snapshot function which holds an image of a logical volume (hereinafter called a source volume) which is designated at a time point when a snapshot acquisition instruction is received. The snapshot function is used to restore the source volume at a time point when data is lost due to human error or when the state of a file system at a desired time point is to be restored.

If a snapshot is acquired by the snapshot function, data which precedes data overwriting (hereinafter called previous data) is subsequently saved to a previous data save logical volume with the timing at which data is written to the source volume. That is, the difference between the source volume at the time point when the snapshot acquisition instruction is received and the current source volume is saved to the previous data save logical volume as previous data. Hence, a data image (snapshot) of the source volume at the snapshot acquisition time point can be restored by combining the data stored in the current source volume with the previous data stored in the previous data save logical volume.

A snapshot function of this kind is advantageous in that the source volume at the time point when snapshot acquisition is ordered can be restored using a smaller storage capacity in comparison with a case where the content of the source volume is stored as is.

However, if a plurality of snapshots are referenced at the same time when a snapshot is used, there is a problem in that the same data of the source volume is referenced and an access conflict in accessing the source volume is generated, resulting in a drop in access performance of the source volume. As the number of snapshots increases, access conflicts more readily occur and the access performance to the source volume drops.

Moreover, the characteristics of access to the source volume differ depending on how a snapshot is used. For example, if a snapshot is used in test processing and batch processing and the like, access to the source volume is temporary or localized and the effect on access performance also varies depending on the snapshot usage method such as in a case where all the data in the source volume is referenced such as in a usage case where the whole table is scanned in a DWH (Data Warehouse) when constructing a virtual machine environment.

CITATION LIST

Patent Literature

[PTL 1] Japanese Unexamined Patent Application Publication No. US2011/0088029

SUMMARY OF INVENTION

Technical Problem

Therefore, in order to maintain the access performance of the source volume, consideration has been given to using an SSD (Solid State Drive) which is a drive apparatus which uses flash memory for the source volume. However, compatibility issues arise if a large-capacity volume is handled or if a multiplicity of volumes are handled due to the small capacity of the SSD and the high costs.

Furthermore, consideration has also been given to maintaining the access performance of the source volume by using a hierarchical control function. A hierarchical control function is a function which manages, as storage tiers of a plurality of different types, each of the storage areas provided by storage devices of a plurality of types of varying performance which are installed in the storage apparatus, assigns storage area from high-speed and high-performance storage tiers to areas where high access frequency data is stored in the virtual volume, and assigns storage area from a low-speed and low-performance storage tier to areas where low access frequency data is stored in the virtual volume. However, there is the problem that, even when the hierarchical control function is used, abrupt load fluctuations cannot be promptly handled due to the long time taken for data to be migrated. In addition, as described earlier, since the effect on the access performance differs depending on the snapshot usage method, it is difficult to maintain the source volume performance by manually executing various control.

The present invention was conceived in view of the points above and proposes a storage apparatus and method of controlling the storage apparatus which enable a drop in access performance to a source volume to be prevented by executing various control according to the snapshot usage method.

Solution to Problem

In order to achieve the foregoing object, the present invention provides a storage apparatus which comprises one or more storage devices which provide storage areas; and a controller which creates a logical volume in the storage area provided by the one or more storage devices, and which reads and writes data from/to the logical volume according to a request from a host, wherein the controller acquires one or more snapshots which are data images at certain time points of the logical volume, wherein the controller determines whether the logical volume is subject to abrupt load fluctuations on the basis of performance information of the logical volume and the snapshots, and wherein, if the logical volume is subject to abrupt load fluctuations, the controller executes predetermined control processing according to usage cases of the snapshots.

With such a configuration, upon receiving a snapshot acquisition instruction, the controller of the storage apparatus creates a snapshot and monitors the performance of the logical volume to determine whether the logical volume is subject to abrupt load fluctuations. Further, if it is determined that the logical volume is subject to abrupt load fluctuations, the controller executes various control processing depending on the snapshot usage case. Here, various control processing can serve as an example of bandwidth control processing, hierarchical control processing, and memory capacity limit processing and the like. A drop in access performance to a source volume can thus be prevented by executing various control according to the snapshot usage method.

Advantageous Effects of Invention

The present invention enables a drop in the access performance to the source volume to be prevented by executing various control according to the snapshot usage method.

BRIEF DESCRIPTION OF DRAWINGS

FIG. 1 is a block diagram showing the whole configuration of a computer system according to an embodiment of the present invention.

FIG. 2 is a block diagram showing a configuration of a disk array device according to this embodiment.

FIG. 3 is a conceptual view illustrating a snapshot usage method according to this embodiment.

FIG. 4 is a table showing snapshot usage cases according to this embodiment.

FIG. 5 is a table showing snapshot configuration information according to this embodiment.

FIG. 6A is a table showing a monitor value management table according to this embodiment.

FIG. 14 is a graph showing IOPS monitoring results according to the same embodiment.

DESCRIPTION OF EMBODIMENTS

Figures 6B, 7:
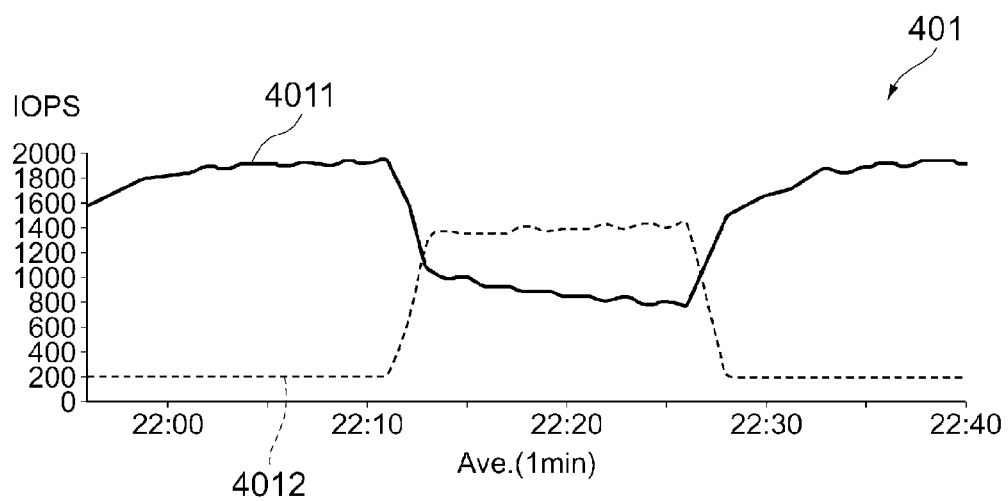
FIG. 6B is a table showing a monitor value management table according to this embodiment.
FIG. 7 is a graph showing IOPS monitoring results according to this embodiment.

An embodiment of the present invention will be described in detail with reference to the drawings hereinbelow.

(1) Computer System Hardware Configuration

First, the hardware configuration of a computer system 1 according to this embodiment will be described. As shown in FIG. 1, the computer system 1 is configured comprising a host 20 and a disk array device 10 which are connected via one or more networks 40.

The network 40 is configured from a SAN (Storage Area Network), a LAN, the Internet, a public line or a lease line or the like, for example. Communications between the hosts 20 and the disk array device 10 via the network 40 are performed according to the fibre channel protocol if the network 40 is a SAN, for example, and are executed according to the TCP/IP (Transmission Control Protocol/Internet Protocol) protocol if the network 40 is a LAN.

The hosts 20A, 20B (subsequently sometimes also referred to as hosts 20) are computer devices which comprise information processing resources such as a CPU (Central Processing Unit) and memory and are configured from a personal computer, a workstation, a mainframe, or the like, for example. The hosts 20 comprise information inputting devices (not shown) such as a keyboard, switch or pointing device, and microphone, and information outputting devices (not shown) such as a monitor display and speaker.

The disk array device 10 is configured comprising a plurality of storage devices 12 and a controller 11 for controlling data I/Os to and from the plurality of storage devices 12.

The storage devices 12 are configured, for example, from high-cost disk devices such as SCSI (Small Computer System Interface) disks or low-cost disk devices such as SATA (Serial AT Attachment) disks or optical disks, or a semiconductor memory such as an SSD (Solid State Drive) or the like.

The storage devices 12 are operated by the controller 11 using a RAID (Redundant Arrays of Inexpensive Disks) system. One or more logical volumes VOL are configured in a physical storage area which is provided by one or more storage devices 12. Further, data is stored by taking, as units, blocks (hereinafter called logical blocks) of a predetermined size (such as 64 (KB), 256 (KB) or the like, for example) in the logical volume VOL.

Unique identification numbers (hereinafter called LUN (Logical Unit numbers) are assigned to each of the logical volumes VOL respectively and unique identification numbers (hereinafter called LBA (Logical Block Address) are assigned in the corresponding logical volumes to each of the logical blocks. In the case of this embodiment, data I/Os are performed by designating addresses which are obtained by combining the LUN and LBA.

The controller 11 is configured comprising a host interface (host I/F in the drawing) 111, a data transfer controller 112, a disk interface (disk I/F in the drawing) 113, a cache memory 114, a local memory 115, and a CPU 110.

The host interface 111 comprises one or more communication ports which are connected to the network 40. Assigned to the communication ports are unique network addresses such as IP (Internet Protocol) addresses and WWN (World Wide Names), for example. The host interface 111 comprises a function for performing protocol control during communications with the host 20 via the network 40, and data and commands are sent and received between the host 20 and the disk array devices 10 according to the FC protocol or the iSCSI protocol or the like by means of the protocol control function of the host interface 111.

The data transfer controller 112 is configured from a PCIe (PCI (peripheral component interconnect) Express) switch, for example, which comprises a function for switching the connected relationships between the host interface 111, the cache memory 114, the disk interface 113, and the CPU 110, in accordance with the control by the controller 11.

The disk interface 113 is an interface with the storage devices 12 and comprises information processing resources such as a CPU and memory and the like. The disk interface 113 reads and writes read data and write data from and to an address location which is designated in the read command or write command in the logical volume VOL designated in the read command or write command by controlling the corresponding storage device 12 according to the write command or read command from the host 20 assigned from the host interface 111.

The cache memory 114 is configured from a volatile memory such as an SDRAM (Synchronous Dynamic Random Access Memory or the like, for example, and is used in order to temporarily store data which is read and written from and to the storage devices 12. Management information, described subsequently, which is used to manage snapshots is also read from the storage devices 12 and stored and held in the cache memory 114.

In addition to being used to store various control programs, the local memory 115 is used in order to temporarily hold various commands such as read commands and write commands which are supplied from the host 20. The CPU 110 processes read commands and write commands which are held in the local memory 115 in the order in which these commands are held in the local memory 115. Various control programs, described subsequently, are stored and held in the local memory 115.

The CPU 110 is a processor which governs the operational control of the whole disk array device 10. The CPU 110 comprises a plurality of cores. Each of the cores executes a plurality of software threads in parallel in a suitable software environment. One or more logical volumes VOL are assigned to each of the cores. The cores are each charged with controlling the read/write processing of data from and to logical volumes VOL are assigned to the respective cores.

A management server 30 is a computer device for archiving or managing the disk array device 10 and is configured from a personal computer or a workstation, for example. Furthermore, the management server 30 comprises information processing resources such as a CPU and memory. The CPU functions as an arithmetic processing device and controls the operations of the management server 30 according to programs and arithmetic parameters which are stored in the memory. Furthermore, the management server 30 comprises information inputting devices such as a keyboard, switch or pointing device, and microphone, and information outputting devices such as a monitor display and speaker, and the operator is able to add or remove storage devices 12 and make changes to the configuration of the storage devices 12, for example, by operating the management server 30.

(2) Configuration of Disk Array Device

A snapshot function which is installed in the disk array device 10 as well as an overview of this embodiment will be described next. The snapshot function is one of the functions of the disk array device 10 and is a function for holding an image of a logical volume (hereinafter referred to as the source volume) which is designated at the moment a snapshot acquisition instruction is received. The snapshot function is used to restore the source volume at a point in time such as when data is deleted due to human error or when a file system state of a desired time point is to be restored.

If a snapshot is acquired by means of the snapshot function, the data prior to overwriting the data (hereinafter called previous data) is subsequently restored to the logical volume used for the previous-data restoration with the timing used for writing the data to the source volume. That is, the difference between the source volume at the time point when the snapshot acquisition instruction is received and the current primary volume is restored as previous data to the previous-data save logical volume. Therefore, by combining data which is stored in the current source volume with the previous data stored in the previous-data save logical volume, a data image (snapshot) of the source volume at the time the snapshot was acquired can be restored.

With such a snapshot function, there is the advantage that, in comparison with cases where the source volume content is stored as is, the source volume at the time snapshot acquisition is ordered can be restored using a smaller storage capacity.

However, when a snapshot is used, if a plurality of snapshots are referenced at the same time, there is a problem in that, as a result of the same data in the source volume being referenced, an access conflict with the source volume is generated and the source volume access performance drops. As the number of snapshots increases, access conflicts easily arise and there is a drop in the access performance to the source volume.

Furthermore, access characteristics for access to the source volume vary depending on how a snapshot is to be used. For example, if a snapshot is used for test processing or batch processing or the like, for example, access to the source volume can be temporary or localized, and the effect on access performance also varies according to the snapshot usage method, such as cases where all the tables in the DWH (Data Warehouse) are scanned or where all the data in the source volume is referenced when a virtual machine environment is constructed.

Therefore, in order to maintain access performance for access to the source volume, consideration has been given to using an SSD (Solid State Drive), which is a drive apparatus which uses flash memory, for the source drive. However, since an SSD has a small capacity and a high cost, compatibility is difficult if dealing with a large-capacity volume or if handling a multiplicity of volumes.

Furthermore, consideration has been paid to maintaining the source volume access performance by using the hierarchical control function. The hierarchical control function is a function for managing each of the storage areas provided by storage devices of a plurality of types of varying performance which are installed in the storage apparatus, for assigning a storage area from a high-speed, high-performance storage tier to an area where high access frequency data in a virtual volume is stored, and for assigning a storage area from a low-speed, low-performance storage tier to an area where low access frequency data in the virtual volume is stored.

However, since it takes time for data to be migrated even when the hierarchical control function is used, there is a problem in that there is no immediate result and it is not possible to promptly respond to abrupt load fluctuations. Furthermore, as mentioned earlier, since the effect on the access performance varies according to the snapshot usage method, it is difficult to maintain the source volume performance by executing various control through manpower. Therefore, in this embodiment, various control is executed according to the snapshot usage method. As a result, it is possible to prevent a drop in access performance of access to the source volume. Snapshot usage methods will be described subsequently.

Various control according to the snapshot usage method includes not only the foregoing hierarchical control function but also a cache capacity limit function and a path bandwidth control function. The hierarchical control function is a function for automatically disposing data optimally between disk array devices as mentioned earlier. For example, the data access frequency is monitored in 42 MB-block units which is a finer granularity than a single volume and data is migrated in block units on the basis of the monitoring result. More specifically, high access frequency blocks are migrated to higher speed media and low access frequency blocks are migrated to lower cost media. As a result, the cost performance of the whole computer system can be improved without an awareness of storage tier usage.

Further, the cache capacity limit function is a function for preventing tasks from affecting one another by optimizing data transmission and reception by dividing the cache memory 114 into optional sizes and by assigning a dedicated cache memory area to each task. The cache memory 114 of the disk array device 10 is a gateway for data transmission and reception from the host 20, and hence optimization of data transmission and reception can be realized by dividing the cache memory 114 into optional sizes and configuring the segment size (data management unit size) of the divided areas according to the task data class.

Furthermore, if there is a mixture of a streaming server which continuously feeds organized unit data and a database server which exchanges small data with an emphasis on response, in a conventional environment where the cache memory is shared, there is sometimes a wait for a database server I/O because a state prevails where the streaming server data constantly occupies the cache memory. However, by assigning dedicated cache memory area to each task by means of the cache capacity limit function, tasks can be prevented from affecting one another.

Further, the path bandwidth limit function is a function which, in order to be able to keep the traffic amount (I/O amount) of a specific host 20 in a high state, gives priority to the execution of I/Os of a specific server by curbing the I/O amount of the other server by configuring an upper limit value for the I/O amount of the other host 20. For example, not only is the storage function path bandwidth controlled, but also, if the network 40 is FCoE and if there are a plurality of queues for a single port of lower priority, lower priority I/O amounts can also be suppressed by using a PAUSE frame for a low priority queue.

The software configuration of the disk array device 10 will be explained next with reference to FIG. 2. As shown in FIG. 2, the local memory 115 of the controller 11 of the disk array device 10 stores a microprogram 150 which is a control program. The microprogram 150 is configured, for example, from a snapshot control program 151, a snapshot performance control program 152, a path bandwidth control program 153, a cache capacity control program 154, and a hierarchical control program 155.

The snapshot control program 151 is a program for controlling the snapshot function. Here, the logical configuration of the snapshot generated by the snapshot control program 151 will be described. The snapshot is configured from three volumes, namely, a source volume 120, target volumes 121A, 121B, and 121C (hereinafter sometimes also described as the target volumes 121), and a data pool (not shown).

The source volume 120 is a logical volume which is provided to the host 20 and from/to which data from the host 20 is read/written. The source volume 120 may be either a logical volume comprising a normal entity or a virtual logical volume without substance.

The target volumes 121 are virtual logical volumes for holding snapshot data and are configured as a copy pair with the source volume 120.

The data pool is a logical volume for storing snapshot management information and previous data which has been restored from the source volume 120. If a snapshot has been acquired, when a write command targeting the source volume is subsequently supplied to the disk array device 10, the data (previous data) in the source volume 120 immediately before an update by means of write processing based on the write command is restored to the data pool. Furthermore, by combining the data restored to the data pool with the data remaining in the source volume (data that has been updated), a data image (snapshot) of the source volume 120 immediately before the update by this write processing can be recovered.

For example, a maximum of 1024 target volumes 121, for example, can be configured for the same source volume 120 in the disk array device 10. In this case, the disk array device 10 is able to acquire a maximum of 1024 snapshots for the same source volume 120.

The snapshot performance control program 152 comprises a function for controlling, according to the snapshot usage method, the path bandwidth control program 153 for managing the path bandwidth control function, the cache capacity control program 154 for managing the cache capacity control function, and the hierarchical control program 155 for managing the hierarchical control function.

As mentioned hereinabove, the greater the number of snapshot pairs assembled, the more the access performance to the source volume 120 drops. This is because an access conflict in accessing the drive is generated with a large number of snapshot pairs because the reference destination of the target volume 121 is the same data track as the source volume 120.

Furthermore, the access characteristics of the target volumes 121 vary according to the snapshot usage method. As shown in FIG. 3, the access characteristics vary in usage cases where there is temporary or localized access to the target volumes 121 as is the case with testing, batch processing, or near CDP, and in usage cases where all the data in the target volume 121 is referenced as in the case of DWH or WM clone. Therefore, the access performance of the source volume 120 drops when an access conflict is generated with greater numbers of I/Os to/from the snapshot as the number of snapshot pairs increases.

Here, CDP is a function which enables the new creation of data recorded in storage or the like to be continuously monitored together with update information and which, by performing required partial backups as needed, is also able to recover data at a particular previous time. Furthermore, near CDP is CDP which performs backups at a time point when a file is closed or when data editing is complete. In comparison with original CDP, where a backup occurs whenever an update is generated, the load on the host can be lightened.

In this embodiment, when a snapshot is created, a drop in performance for the source volume 120 can be prevented by using migration control in block/volume units, path bandwidth (throughput) control, or cache capacity control depending on the usage case. Further, the access performance value of the source volume 120 is acquired to determine whether there is a drop in access volume performance or whether performance reflects a performance drop countermeasure.

Furthermore, if the usage case of the target volume 121 involves a regular load, data is migrated beforehand in block units or volume units to prevent a drop in performance for the source volume 120. In addition, if the usage case of the target volume 121 is involves a sudden load variation, since an immediate response to a drop in the access performance during data migration cannot be expected, path bandwidth (throughput) control and cache capacity control and the like are executed to promptly prevent a drop in the access performance. In addition, if there is a drop in the load on the target volume 121 and it is determined that there is no effect on the performance for the source volume 120, data which has been migrated by means of migration control may be returned to the pre-migration volume or similar and bandwidth control and cache capacity limits may be removed.

Snapshot usage cases will be described next. As shown in FIG. 4, for example, if the usage case is a test, this usage case is characterized in that online transaction (OLTP in the drawings) processing is executed for the source volume 120, the original and copy volumes are used simultaneously, and access to the target volumes 121 is to localized sites. Further, if the usage case is a test, priority is given to online transactions, a bandwidth limit on the target volumes 121 is required, and if the source volume 120 and target volumes 121 are used simultaneously, hierarchical control is required, and, in the case of a regular load, the source volume may be pre-migrated to the upper tier. Furthermore, the tier migration class (unit) is a block and a cache capacity limit is unnecessary.

Furthermore, if the usage case is batch, this usage case is characterized in that online transaction (OLTP in the drawings) processing is executed for the source volume 120, the original and copy drives are used simultaneously, and access to the target volumes 121 is at localized sites and times. Further, if the usage case is batch, priority is given to online transactions, bandwidth limits on the target volumes 121 are required, and hierarchical control in order to reference only the updated portion of the source volume 120 is unnecessary. In addition, the tier migration class (unit) is block and a cache capacity limit is not required.

In addition, if the usage case is near CDP, because the original and copy volumes are not used simultaneously, there is no need to execute control to prevent a drop in the access performance by means of hierarchical control and bandwidth limits and so forth.

Furthermore, if the usage case is DWH, this usage case is characterized in that online transaction (OLTP in the drawings) processing is executed for the source volume 120, the original and copy volumes are used simultaneously, and access to the target volumes 121 is to all the data. Further, if the usage case is DWH, online transactions are prioritized and bandwidth limits are required for the target volume 121 and, in the case of a regular load, the source volume 120 may be pre-migrated to the upper tier. In addition, the tier migration class (unit) is a volume and a cache capacity limit is required. In DWH, since the volume is high capacity, a cache capacity limit is required in order to prevent interference with the other online transaction volumes.

Further, if the usage case is VM clone, this usage case is characterized in that the source volume 120 exists as a master volume, the original and copy volumes are used simultaneously, and access to the target volumes 121 is to all the data. Further, if the usage case is VM clone, there is no priority ranking between the source volume (master) 120 and the target volumes (clones) 121, a bandwidth limit is required for the target volumes 121, and hierarchical control is required for a regular load and the like.

Since the source volume 120 and target volumes 121 have a master and clone relationship, limits are required so that the bandwidth between the source volume 120 and the target volumes 121 is uniform. In addition, the hierarchical migration class (unit) is a volume and a cache capacity limit is required. The VM clone is likely to occupy the cache between snapshot groups and hence cache capacity limits between groups are required.

These usage cases are identified by the operator or identified automatically by the snapshot performance control program 152. For example, if the access range to the target volumes 121 is localized, the usage case can be identified as being test or batch processing. Furthermore, if the access range to the target volumes 121 is access to all the data, the usage case can be identified as DWH. Furthermore, in a case where the host mode of the host I/F 111 is VMware, an XCopy command is received, and the access range to the target volumes 121 is access to all data, the usage case can be identified as VM clone.

Snapshot configuration information will be described next with reference to FIG. 5.

The snapshot control program 151 references the snapshot 170 stored in the cache memory 114 and manages snapshots. As shown in FIG. 3, the host 20 identifies the source volume 120 and the target volumes 121 by means of WWNs.

Therefore, unique WWN are assigned to each of the source volume 120 and the target volumes 121. Further, the snapshot configuration information 170 manages which host interface 111 the source volume 120 and the target volumes 121 are connected to, which controller 11 the volumes are controlled by, and which logical volume (LU) is used.

More specifically, as shown in FIG. 5, the snapshot configuration information 170 is configured from a volume name field 1701, a WWN field 1702, a host IF field 1703, a controller field 1704, and an LU field 1705. The volume name field 1701 stores volume names which are assigned to the source volume 120 or the target volumes 121. The WWN field 1702 stores the WWN of the source volume 120 or the target volumes 121. The host IF field 1703 stores the names of the host interfaces connected to the source volume 120 or target volumes 121. The controller field 1704 stores the names of the controller 11 controlling the source volume 120 or the target volumes 121. The LU field 1705 stores the names of the logical volumes assigned to the source volume 120 or the target volume 121.

Furthermore, the snapshot performance control program 152 monitors access performance (IOPS) in WWN units or LU units and manages the IOPS monitor values in WWN units or LU units. For example, as shown in FIG. 6A, the monitor value management table (WWN unit) 181 is configured from a time field 1811 and an IOPS field 1812 and associates the time the IOPS is monitored with monitor values (IOPS). Furthermore, as shown in FIG. 6B, the monitor value management table (LU unit) is configured from a time field 1821 and an IOPS field 1822 and associates the monitor value (IOPS) with the time the IOPS is monitored.

(3) Computer System Operation (3-1) Overview of Computer System Operation

Details of the operation of the disk array device 10 in the computer system 1 will be described next. Upon receiving a snapshot acquisition instruction from the management server 30, the disk array device 10 creates a snapshot and monitors the IOPS of each volume. FIG. 7 shows the IOPS monitoring results. As shown in FIG. 7, graph 4011 shows the IOPS monitor value of the source volume 120 and graph 4012 shows the IOPS monitor value of the target volume 121. As shown in FIG. 7, if the IOPS value (graph 4011) of the source volume 120 suddenly drops and it is identified that this is a regular load, data has been migrated beforehand by means of hierarchical control or the like. Further, if the regular load is canceled, data is migrated to the configuration location prior to data migration.

In addition, if it is identified that the IOPS value of the source volume 120 is subject to unpredictable abrupt load fluctuations, it is determined whether the snapshot corresponds to any usage case. As mentioned earlier, if the usage case is a case other than VM clone, access to the source volume 120 must be prioritized. Therefore, it is determined whether the IOPS value of the WWN corresponding to the source volume 120 is below a predetermined threshold, and if below the predetermined threshold, control to prevent a drop in access performance to the source volume 120 is performed. More specifically, the disk array device 10 executes path bandwidth control and eliminates controller bottleneck if the usage case is test or batch. Furthermore, if the usage case is DWH, the disk array device 10 performs path bandwidth control to eliminate controller bottleneck and executes hierarchical control to eliminate volume bottleneck.

Figure 8:
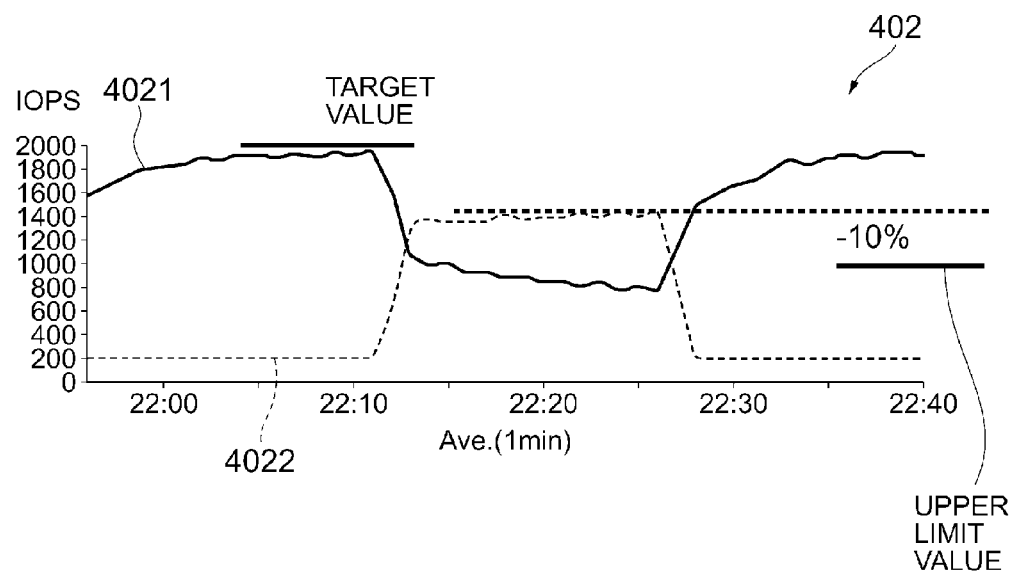
FIG. 8 is a graph showing IOPS monitoring results according to this embodiment.

Further, the disk array device 10 determines whether the IOPS value of the WWN which corresponds to the source volume 120 by executing path bandwidth control has reached a target value. As shown in FIG. 8, for example, the disk array device 10 exercises path bandwidth control in which the throughput of the target volume 121 is made 90% and determines whether the IOPS value of the source volume 120 has reached the target value. If the IOPS value of the source volume 120 has not reached the target value even though the throughput of the target volume 121 is at 90%, the disk array device 10 sets the throughput of the target volume 121 at 80%. In addition, if the IOPS value of the source volume has not reached the target value even when the throughput of the target volume 121 is 80%, the disk array device 10 sets the throughput of the target volume 121 at 70%.

Figure 9:
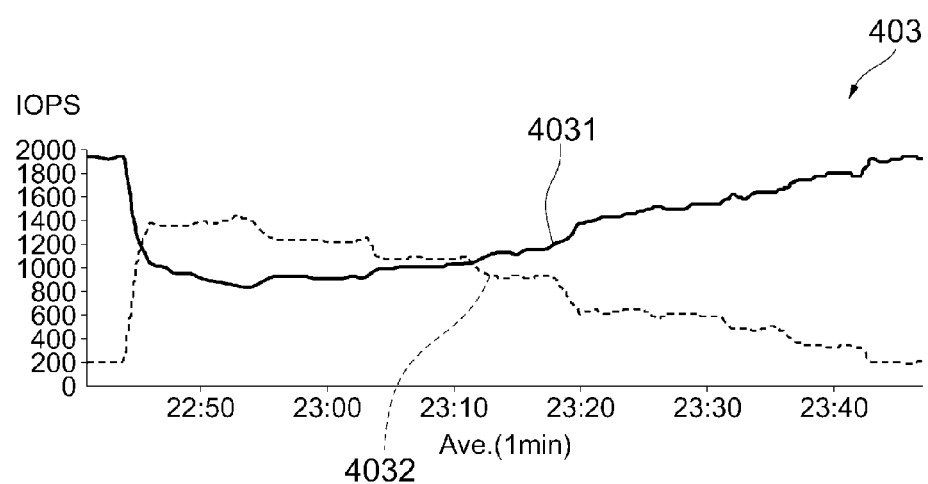
FIG. 9 is a graph showing IOPS monitoring results according to this embodiment.
Figure 10:
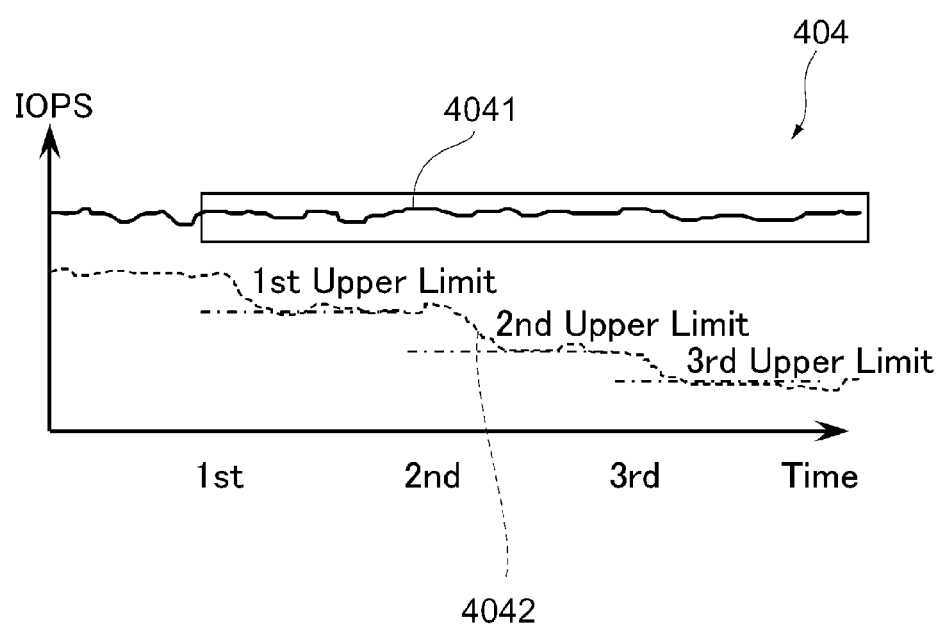
FIG. 10 is a graph showing IOPS monitoring results according to this embodiment.

Accordingly, while lowering the throughput of the target volume 121 in stages, the disk array device 10 monitors the IOPS value of the WWN which corresponds to the source volume 120 and exercises control so that the access performance to the source volume 120 reaches the target value. FIG. 9 shows a case where the IOPS value 4031 of the WWN corresponding to the source volume 120 has reached the target value. Further, FIG. 10 shows a case where there is absolutely no change in the IOPS value 4041 of the WWN corresponding to the source volume 120 even when the throughput of the target volume 121 is limited in stages.

Figure 11:
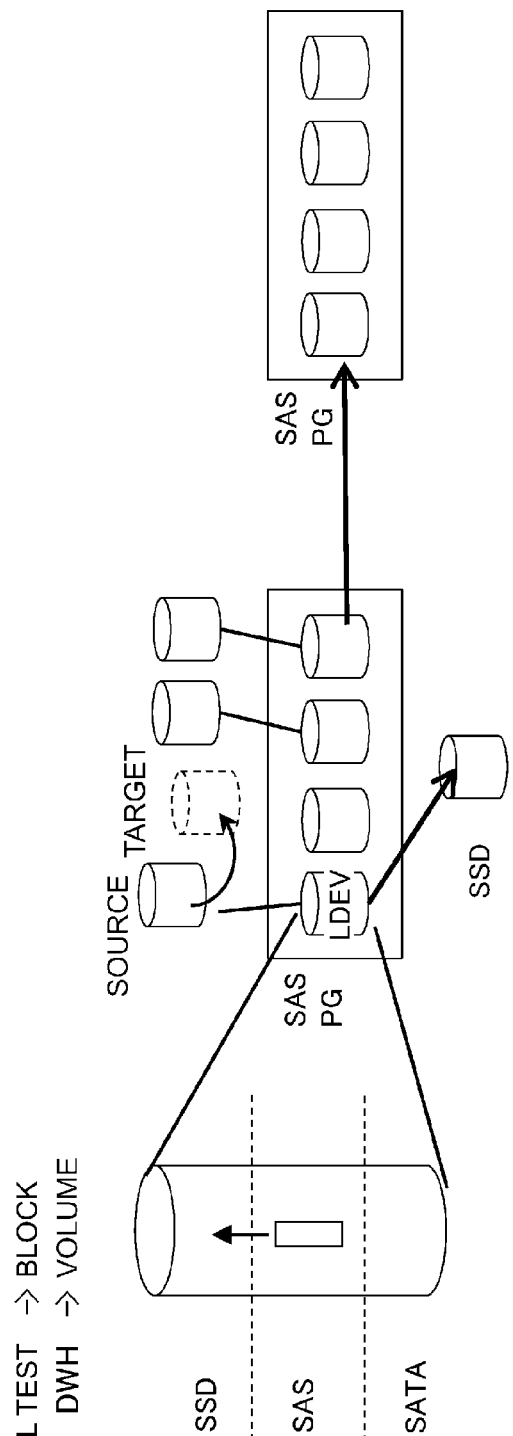
FIG. 11 is a conceptual view providing an overview of hierarchical control processing according to this embodiment.

Further, if the access performance to the source volume 120 has not reached the target value even when the throughput of the target volume 121 is lowered in stages, the disk array device 10 performs hierarchical control to eliminate volume bottleneck. For example, as shown in FIG. 11, the disk array device 10 migrates data of the source volume 120 (LDEV) from SAS to SSD. For example, if the usage case is test, in which access is made to a partial area of the target volume 121, the disk array device 10 migrates data in block units. Furthermore, if the usage case is DWH, in which access is made to the whole area of the target volume 121, the disk array device 10 migrates data in volume units.

Figure 12:
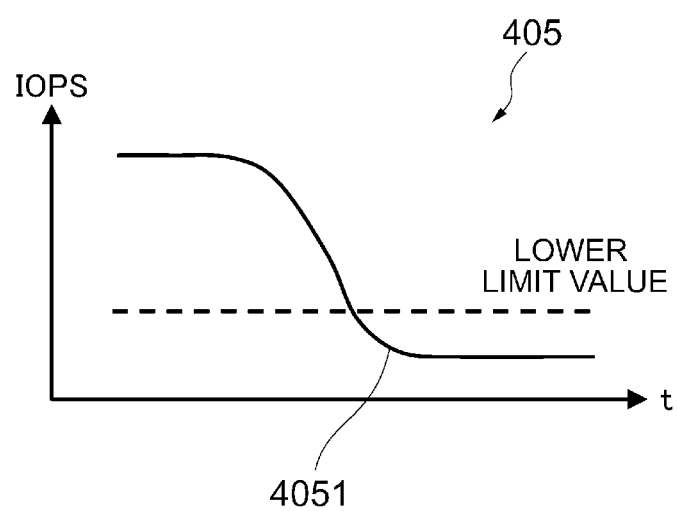
FIG. 12 is a graph showing IOPS monitoring results according to this embodiment.

Furthermore, as shown in FIG. 12, if the IOPS value of the WWN corresponding to the source volume 120 is below a lower limit, the disk array device 10 cancels the upper limit configuration for the bandwidth control of the target volumes 121 and migrates data to the configuration location before hierarchical control is exercised, that is, before data is migrated.

Figure 13:
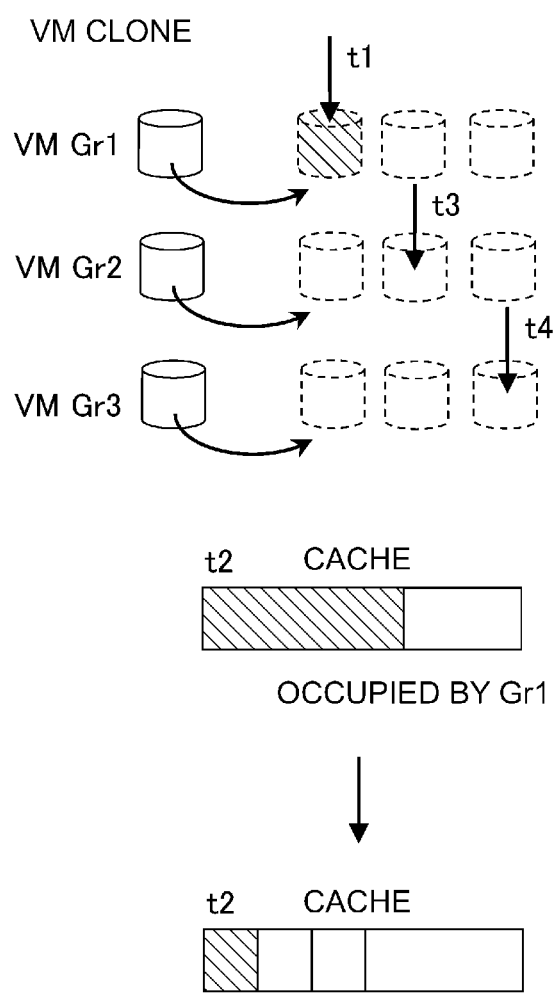
FIG. 13 is a conceptual view illustrating an overview of a VM clone according to this embodiment.

In addition, if the source volume is subject to unpredictable abrupt load fluctuations and the snapshot usage case is VM clone, the disk array device 10 limits the cache capacity occupied by each volume. For example, as shown in FIG. 13, if three VM clones exist, namely, VMGr1, VMGr2 and VMGr3, when the cache memory 114 is occupied by VMGr1, VMGr2 and VMGr3 cannot use the cache memory 114 and cache hits are impossible.

As mentioned earlier, since there is no priority ranking between the three VM clones, namely, VMGr1, VMGr2 and VMGr3, the VM clones must all have the same performance. Therefore, as shown in the graph 501 in FIG. 14, the disk array device 10 limits the cache capacity which can be used by each of the VM clone volumes if the total value of the volume performance of each VM clone volume is fixed. More specifically, the upper limit value of the cache capacity which can be used by each of the VM clone volumes is a value which is obtained by dividing the performance total value by the number of VM clone volumes.

Further, as shown in graph 502 in FIG. 14, if the VM clone groups are used simultaneously, the access performance of each group is controlled so as to not exceed an upper limit value. Furthermore, if the usage frequency of a VM clone volume is low, the disk array device 10 cancels the upper limit value of the bandwidth limit. As a result, if the total number of accesses to the VM clone volume is equal to or more than the predetermined upper limit value, the performance is equalized by limiting the cache capacity which can be used by each VM clone volume. Furthermore, if the total number of accesses to the VM clone volume does not exceed the predetermined upper limit value, the disk array device 10 cancels the cache capacity limit to prevent an unnecessary drop in the access performance.

(3-2) Snapshot Performance Control Processing

Details of snapshot performance control processing by the disk array device 10 will be provided next. Note that, although the subject of the various processing is described hereinbelow as being a program, it goes without saying that, in reality, the CPU 110 of the disk array device 10 executes the processing on the basis of the program.

Figure 15:
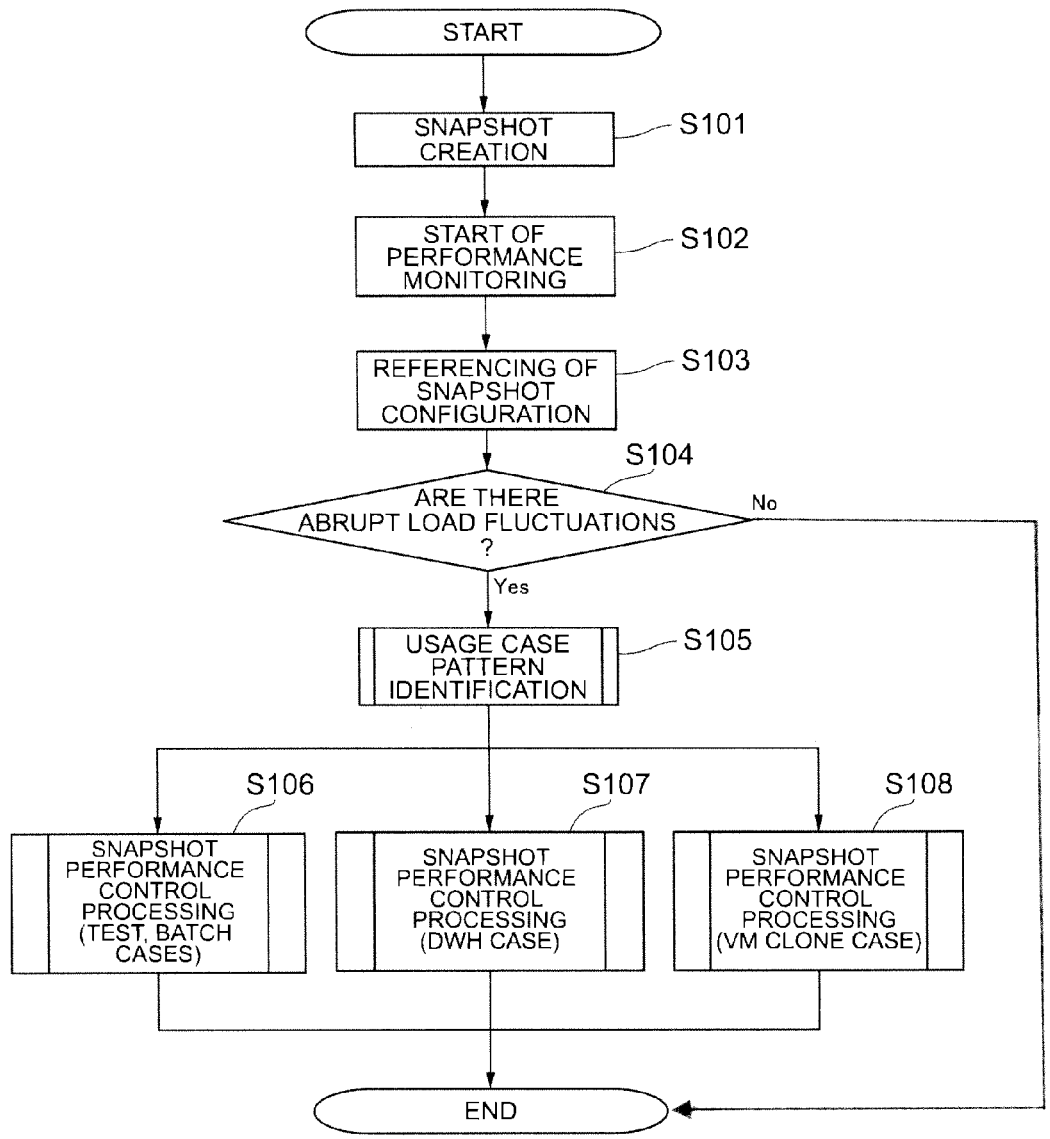
FIG. 15 is a flowchart showing details of snapshot performance control processing according to this embodiment.

As shown in FIG. 15, when a snapshot acquisition instruction is received from the host 20 or the management server 30, the snapshot control program 151 first creates a snapshot (S101). Further, when the snapshot is created in step S101, the snapshot performance control program 152 starts performance monitoring (S102). More specifically, the snapshot performance control program 152 monitors the WWN which correspond to the source volume 120 and the target volumes 121 and monitors the IOPS of the logical volumes which correspond to the source volume 120 and the target volumes 121.

Furthermore, the snapshot performance control program 152 references the snapshot configuration information 170 (S103). As shown in FIG. 5, the snapshot configuration information 170 is information showing the associations between the source volume 120, the target volumes 121, the WWN, and the logical volume names and the like.

Further, the snapshot performance control program 152 determines whether there are sudden load fluctuations on the basis of the monitoring result started in step S102 (S104). More specifically, the snapshot performance control program 152 determines that there are abrupt load fluctuations if the performance value of the source volume 120 which is prioritized is the inverse of the performance value of the target volume 121 which is not given priority.

Furthermore, the snapshot performance control program 152 determines that there are abrupt load fluctuations if the performance value of the source volume 120 which is prioritized is below the predetermined threshold. In addition, although the total of the performance values of the source volume 120 which is prioritized and of the target volume 121 which is not prioritized is fixed, the snapshot performance control program 152 determines that there are abrupt load variations if the performance of the source volume 120 drops. Further, the snapshot performance control program 152 may determine, based on regularly issued user commands, that the load is not subject to abrupt load fluctuations, that is, there are regular load fluctuations.

Figure 16:
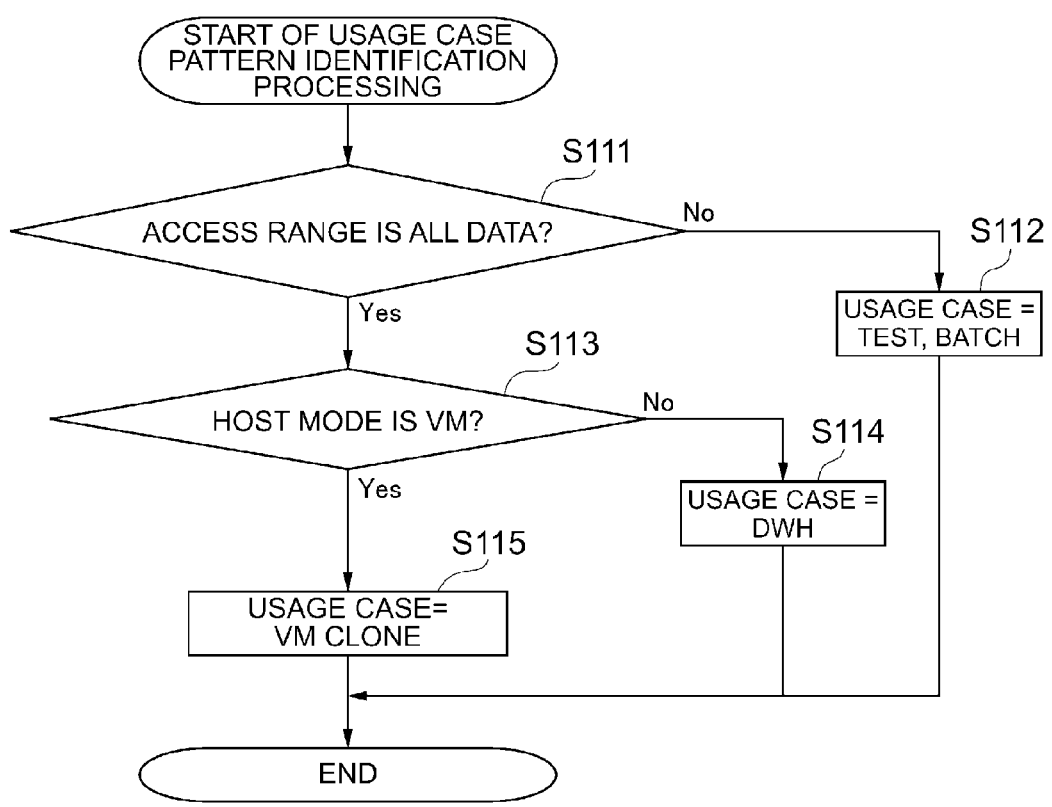
FIG. 16 is a flowchart showing details of pattern discrimination processing of a usage case according to this embodiment.

The snapshot performance control program 152 then identifies patterns for snapshot usage cases (S105). FIG. 16 shows the details of pattern identification processing of usage cases by means of the snapshot performance control program 152.

As shown in FIG. 16, the snapshot performance control program 152 determines whether the access range from the host 20 is all data (S111). More specifically, the snapshot performance control program 152 determines whether the bitmap flags corresponding to the access range are all 1 and, if the flags are all 1, determines that access targets all the data.

If it is determined in step S111 that the access range is not all data, since the access range is localized, the snapshot performance control program 152 determines that the snapshot usage case is test or batch processing (S112).

Meanwhile, if it is determined in step S111 that the access range is all data, the snapshot performance control program 152 determines whether the host mode of the host I/F 111 is VMware mode and if an XCopy command has been received (S113). If it is determined in step S113 that the host mode is WMware mode, the snapshot performance control program 152 determines that the snapshot usage case is WM clone (S115). Meanwhile, if it is determined in step S113 that the host mode is not WMware mode, the snapshot performance control program 152 determines that the snapshot usage case is DWH (S114).

Returning to FIG. 15, if the snapshot usage case is test or batch, the snapshot performance control program 152 executes the snapshot performance control processing of step S106. Furthermore, if the snapshot usage case is DWH, the snapshot performance control program 152 executes the snapshot performance control processing of step S107. Further, if the snapshot usage case is WM clone, the snapshot performance control program 152 executes the snapshot performance control processing of step S108.

Figure 17:
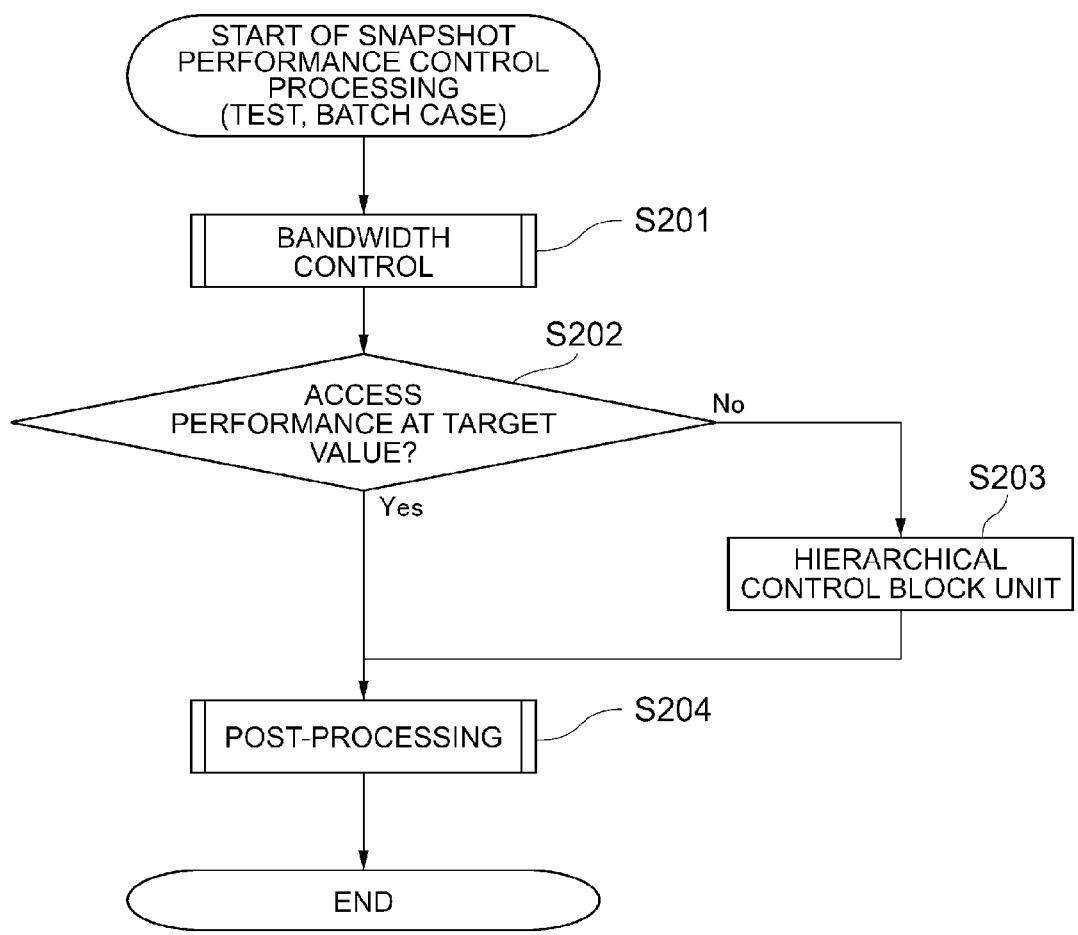
FIG. 17 is a flowchart showing details of snapshot performance control processing according to this embodiment.
Figure 18:
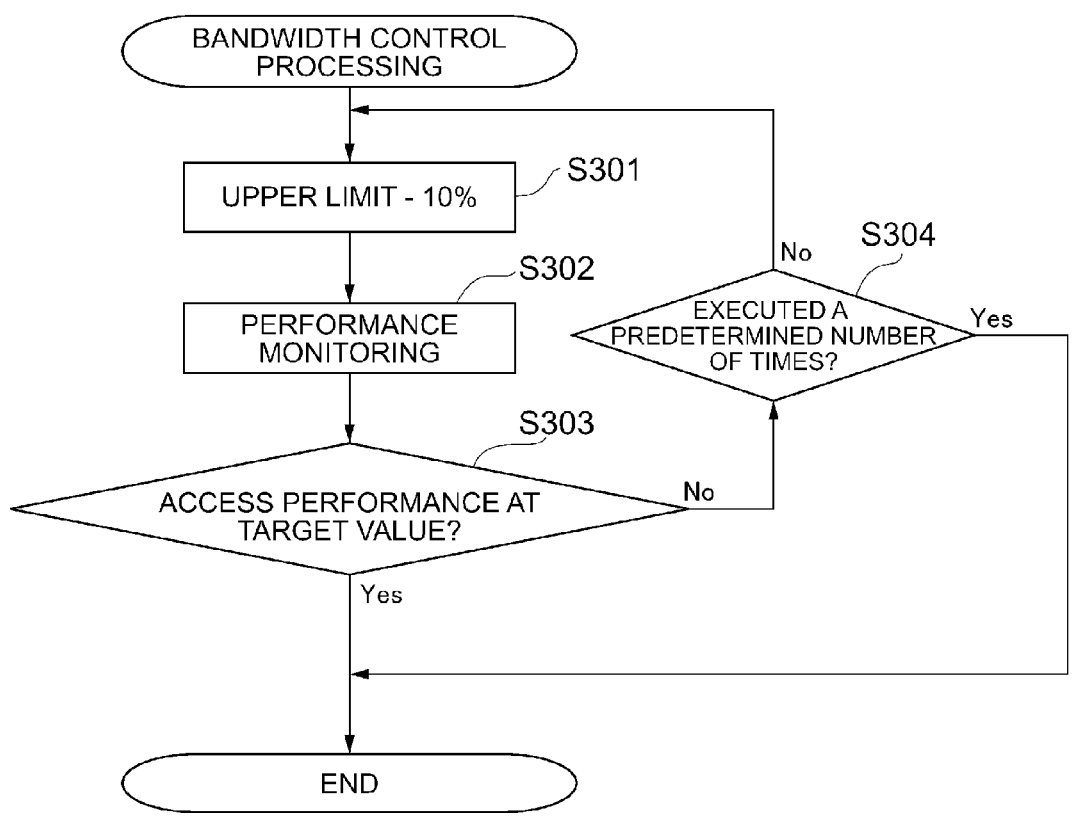
FIG. 18 is a flowchart showing details of bandwidth control processing according to this embodiment.

The snapshot performance control processing in a case where the snapshot usage case is test or batch and which is executed in step S106 will be described next. As shown in FIG. 17, the snapshot performance control program 152 first executes bandwidth control processing (S201). More specifically, the snapshot performance control program 152 limits the path bandwidth of the target volume 121 which is the non-priority destination. FIG. 18 shows the details of bandwidth control processing by the snapshot performance control program 152.

As shown in FIG. 18, the snapshot performance control program 152 first reduces the upper limit value of the throughput of the target volume 121 by 10% (S301). For example, if the initial value for the upper limit value for the throughput is 100%, the snapshot performance control program 152 first sets the throughput of the target volume 121 at 90%.

Further, the snapshot performance control program 152 monitors the access performance of the source volume 120 (S302). The snapshot performance control program 152 then determines whether the access performance of the source volume 120 monitored in step S302 has reached the target value (S303).

If it is determined in step S303 that the access performance of the source volume 120 has reached a target value, the snapshot performance control program 152 ends the bandwidth control processing.

If, on the other hand, it is determined in step S303 that the access performance of the source volume 120 has not reached the target value, the snapshot performance control program 152 determines that the processing of steps S301 to S303 has been executed a predetermined number of times (S304). For example, the snapshot performance control program 152 may also end the bandwidth control processing if the access performance of the source volume 120 has not reached the target value even when the processing of steps S301 to S303 has been executed three times. Further, the snapshot performance control program 152 may end the bandwidth control processing if the access performance of the source volume 120 has not reached the target value even after lowering the upper limit value for the target volume throughput to a predetermined value. If the cause of the drop in access performance of the source volume 120 is due to the processing performance of the controller 11, since the access performance of the source volume 120 is not restored even when bandwidth control processing alone is executed, further control processing such as hierarchical control processing must be executed after executing the bandwidth control processing a predetermined number of times.

Returning to FIG. 17, the snapshot performance control program 152 determines whether the access performance has reached the target value as a result of performing the bandwidth control in step S201 (S202) and, if the access performance has not reached the target value despite performing the bandwidth control processing, carries out hierarchical control processing (S203). Since the access range is localized if the snapshot usage case is test or batch, the snapshot performance control program 152 performs block-unit hierarchical control processing in step S203.

Figure 19:
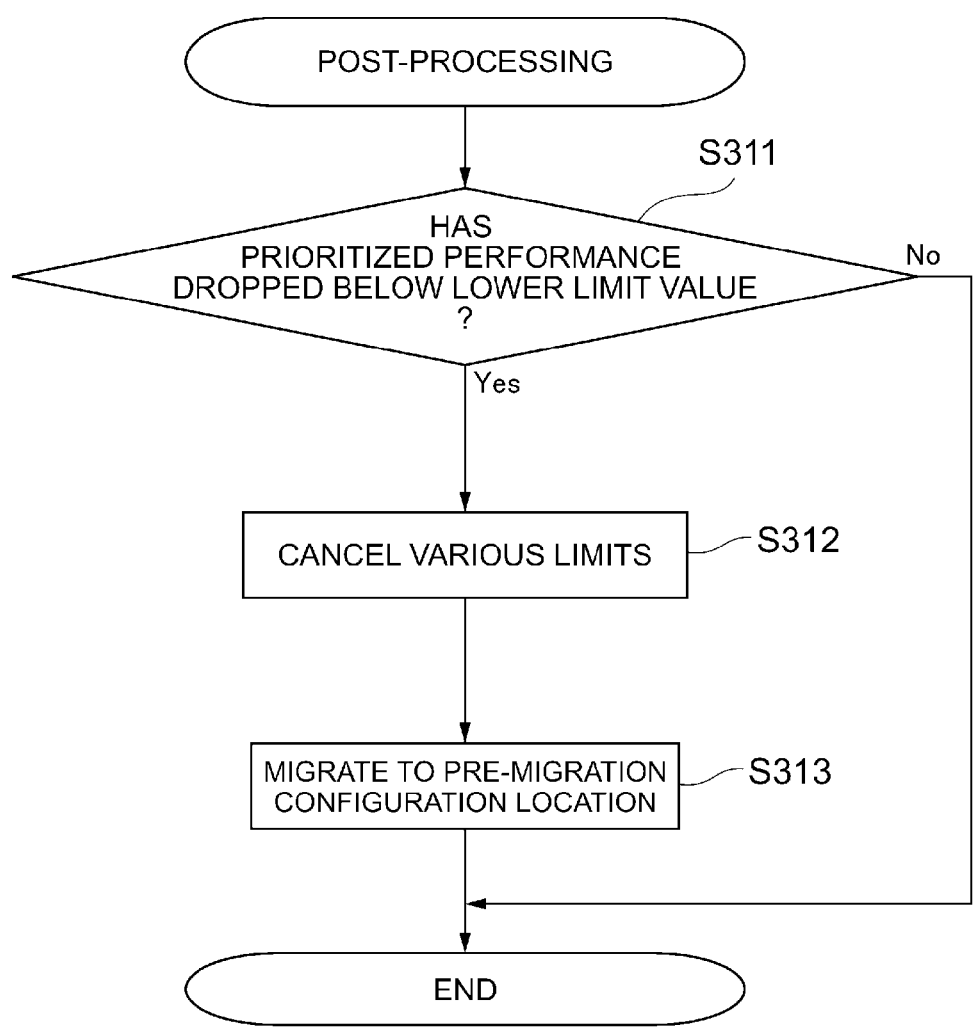
FIG. 19 is a flowchart showing details of post-processing according to this embodiment.

Further, if it is determined in step S202 that the access performance has reached the target value, the snapshot performance control program 152 executes post-processing (S204). FIG. 19 shows the details of the post-processing by the snapshot performance control program 152.

As shown in FIG. 19, the snapshot performance control program 152 determines whether the performance of the source volume 120 which is prioritized has dropped below a lower limit value (S311).

If, on the other hand, it is determined in step S311 that the performance of the source volume 120 which is prioritized has dropped below the lower limit value, the snapshot performance control program 152 cancels the various limits (S312). Because bandwidth control processing is being executed in step S201, the snapshot performance control program 152 cancels the bandwidth limit for the target volume 121 in step S312. Furthermore, if hierarchical control processing is being executed in step S203, the snapshot performance control program 152 migrates data to the pre-migration configuration location (S313). If the performance of the source volume 120 is a normal value, by canceling the various limits and returning the migrated data to the original configuration location, management of the disk array device 10 by the operator or the like is facilitated.

Figure 20:
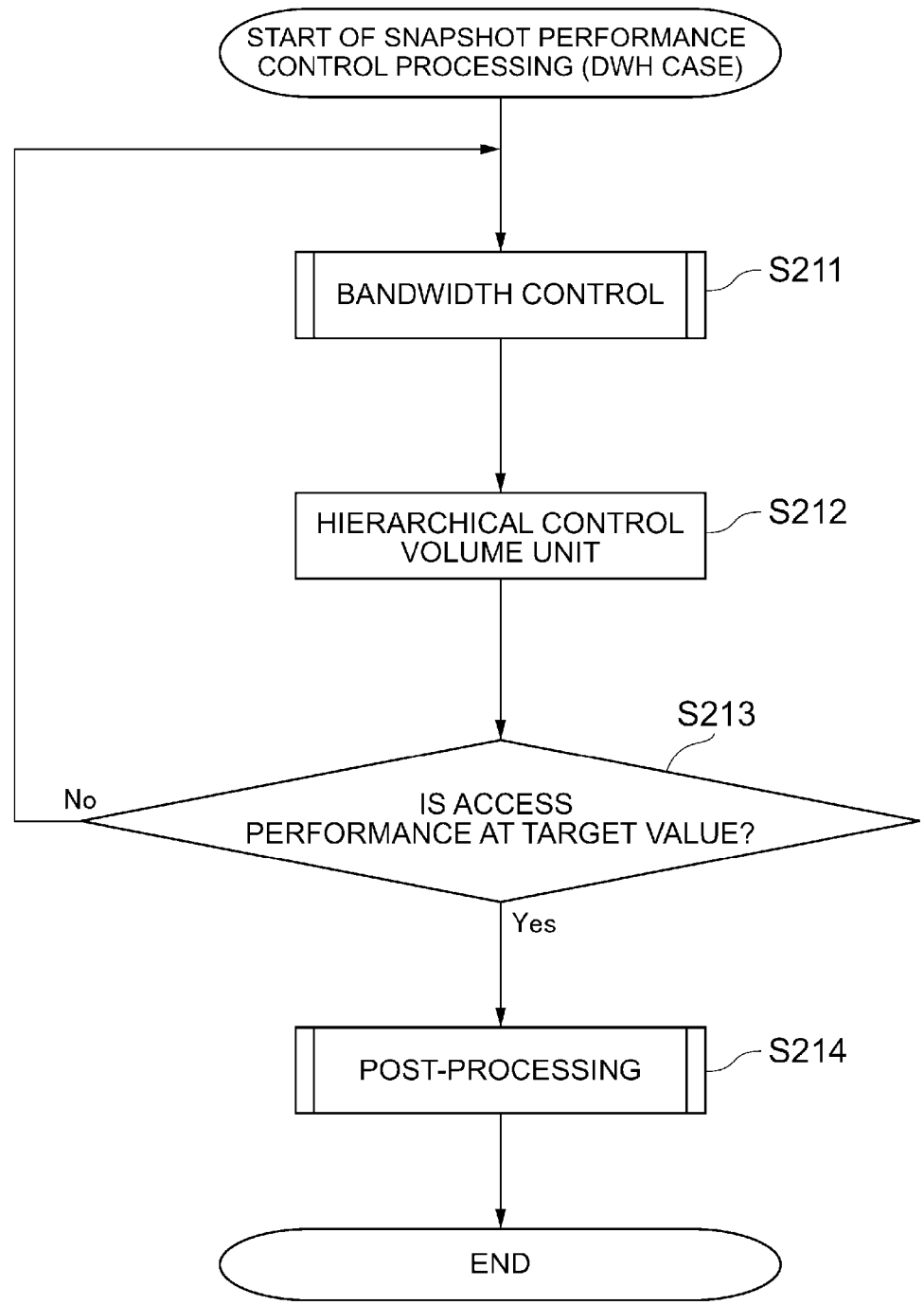
FIG. 20 is a flowchart showing details of snapshot performance control processing according to this embodiment.

The snapshot performance control processing in a case where the snapshot usage case is DWH and which is executed in step S107 will be described next. As shown in FIG. 20, the snapshot performance control program 152 executes bandwidth control processing (S211). The bandwidth control processing in step S211 is the same as the bandwidth control processing of step S201 above, and hence a detailed description is omitted here.

The snapshot performance control program 152 then carries out hierarchical control processing (S212). Since the access range is all data access if the snapshot usage case is DWH, the snapshot performance control program 152 executes volume unit hierarchical control processing in step S212. Further, if the usage case is DWH, since the access range falls within a wide range, hierarchical control processing must be carried out. However, since this is not immediately reflected in the access performance even when hierarchical control processing is carried out, the bandwidth control processing in step S211 is also executed. Note that the bandwidth control processing in step S211 and the hierarchical control processing in step S212 may also be carried out in parallel.

Further, the snapshot performance control program 152 determines whether the access performance has reached a target value (S213). If it is determined in step S213 that the access performance has not reached the target value, the snapshot performance control program 152 repeats the processing of step S211 and subsequent steps.

If, on the other hand, it is determined in step S213 that the access performance has reached the target value, the snapshot performance control program 152 executes post-processing (S214). The post-processing in step S214 is the same as the post-processing of step S204 above, and hence a detailed description is omitted here.

Figure 21:
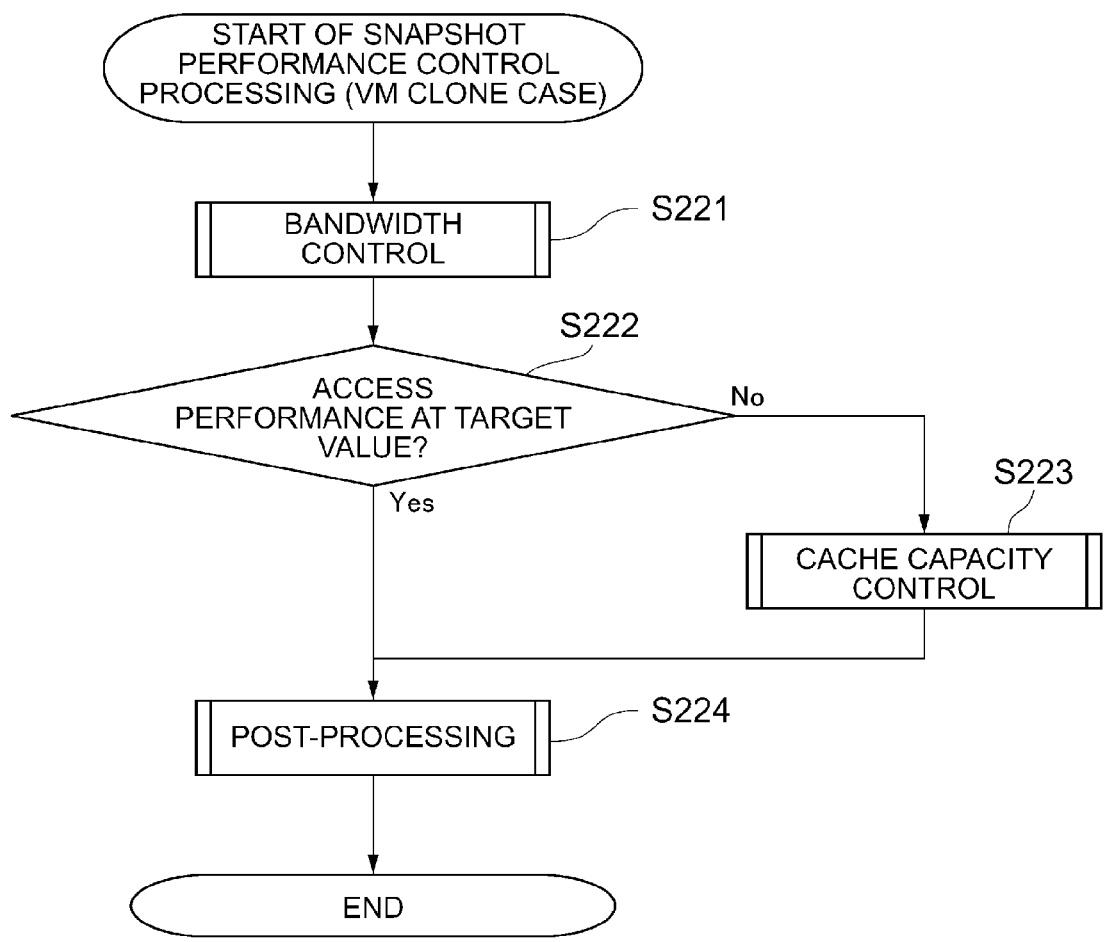
FIG. 21 is a flowchart showing details of snapshot performance control processing according to this embodiment.

The snapshot performance control processing in a case where the snapshot usage case is VM clone and which is executed in step S 108 will be described next. As shown in FIG. 21, the snapshot performance control program 152 executes bandwidth control processing (S221). The bandwidth control processing in step S221 is the same as the bandwidth control processing of step S201 earlier, and hence a detailed description is omitted here.

The snapshot performance control program 152 then determines whether the access performance has reached the target value as a result of performing the bandwidth control in step S221 (S222) and, if the access performance has not reached the target value despite performing bandwidth control processing, carries out cache capacity control (S223). Cache capacity control processing in step S223 will be described in detail subsequently.

Further, if the IOPS value of the WWN corresponding to the source volume 120 drops below a lower limit value, the snapshot performance control program 152 executes post-processing (S224). The post-processing in step S224 is the same as the post-processing of step S204 above, and hence a detailed description is omitted. In step S224, the snapshot performance control program 152 cancels the cache capacity limit configured in step S223.

Figure 22:
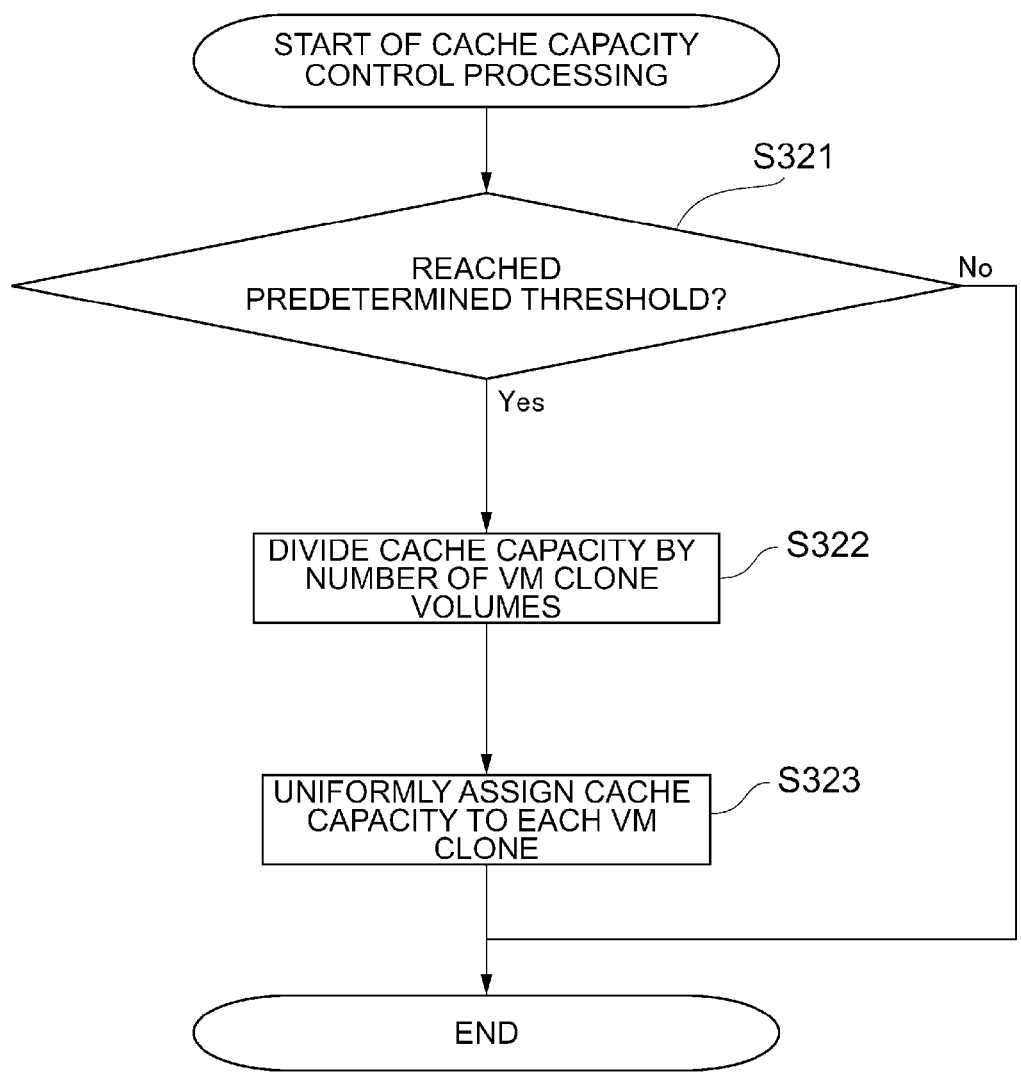
FIG. 22 is a flowchart showing details of cache capacity control processing according to this embodiment.

Details of the cache capacity control processing in step S223 will be described next. As shown in FIG. 22, the snapshot performance control program 152 first determines whether the volume performance of each VM clone volume has reached the predetermined threshold (S321).

If it is determined in step S321 that the volume performance of each VM clone volume has reached a predetermined threshold, the snapshot performance control program 152 divides the cache capacity by the number of VM clone master volumes (S322). The snapshot performance control program 152 then distributes the cache capacity thus divided in step S322 equally among the VM clones (S323). If the volume performance of each VM clone volume has reached a predetermined threshold, the VM clones are similarly able to use the cache memory 114 as a result of the cache capacity being assigned equally to each of the VM clones.

(4) Effect of Embodiment

According to the embodiment as described hereinabove, upon receiving a snapshot acquisition instruction, the disk controller (controller) 11 of the disk array device (storage apparatus) 10 creates a snapshot, monitors the performance of the source volume (logical volume) 120 and the target volumes (snapshots) 121 and determines whether the source volume 120 is subject to abrupt load fluctuations. Further, if it is determined that the source volume 120 is subject to an abrupt load, [the disk controller 11] executes various control processing such as bandwidth control processing, hierarchical control processing, and memory capacity limit processing according to the snapshot usage case.

When a snapshot is created in this manner, a drop in performance of the source volume 120 is prevented by using migration control in block/volume units, path bandwidth (throughput) control, and cash capacity control depending on the usage case. Furthermore, in order to prevent a drop in performance of the source volume 120, priority is given to the execution of processing of the source volume 120 by the host 20 by determining the priority rankings for the source volume 120 and the target volumes 121. In addition, determination is made whether the access volume performance has dropped or whether the performance drop prevention policy has been reflected by adopting the access performance value of the source volume 120.

Furthermore, if the usage case of the target volume 121 involves a regular load, data is migrated beforehand in block units or volume units to prevent a drop in performance for the source volume 120. In addition, if the usage case of the target volume 121 is involves a sudden load variation, since an immediate response to a drop in the access performance during data migration cannot be expected, path bandwidth (throughput) control and cache capacity control and the like are executed to promptly prevent a drop in the access performance. In addition, if there is a drop in the load on the target volume 121 and it is determined that there is no effect on the performance for the source volume 120, data which has been migrated by means of migration control may be returned to the pre-migration volume or similar and bandwidth control and cache capacity limits may be removed.

(5) Further Embodiments

For example, the steps of the processing of the disk array device 10 of this specification do not necessarily each need to be processed in chronological order according to the sequence outlined as a flowchart. In other words, each of the steps of the processing of the disk array device 10 may also be executed in parallel even in different processes.

Moreover, a computer program enabling the hardware such as the CPU, ROM, and RAM and the like which are installed in the disk array device 10 or the like to exhibit the same functions as each of the configurations of the disk array device 10 above can also be created. Further, a storage medium storing this computer program may also be provided

REFERENCE SIGNS LIST

1 Computer system
10 Disk array device
11 Controller
12 Storage device
20 Host
30 Management server
40 Network
111 Host interface
112 Data transfer controller
113 Disk interface
114 Cache memory
115 Local memory
120 Source volume
121 Target volume
150 Microprogram
151 Snapshot control program
152 Snapshot performance control program
153 Path bandwidth control program
154 Cache capacity control program
155 Hierarchical control program

The invention claimed is:

1. A storage apparatus, comprising:
one or more storage devices configured to provide storage areas; and
a controller configured to create a logical volume in the storage area provided by the one or more storage devices and to read and write data from/to the logical volume according to a request from a host, wherein the controller is configured to acquire one or more snapshots which are data images at certain time points of the logical volume, wherein the controller is configured to determine whether one of the following conditions is met: a performance value of the one or more snapshots exceeds a performance value of the logical volume; or the performance value of the logical volume is below a predetermined threshold, wherein, when one of the conditions is met, the controller is configured to execute predetermined control processing according to usage cases of the snapshots;

wherein the controller is configured to determine whether the usage case is a usage case in which an access range of the one or more snapshots is localized data or a usage case in which the access range is all data;

wherein the controller is configured to determine whether the logical volume is a usage case of a volume with a higher priority ranking than the one or more snapshots;

wherein the controller is configured to execute capacity limits for a cache memory when the usage case is a usage case where the access range of the one or more snapshots is all data and there is parity between the logical volume and the one or more snapshots.

2. The storage apparatus according to claim 1, wherein the controller is configured to execute bandwidth limits for the one or more snapshots when the usage case is a usage case in which the access range of the one or more snapshots is localized data and where the logical volume is a volume with a higher priority ranking than the one or more snapshots.

3. The storage apparatus according to claim 1, wherein the controller is configured to execute bandwidth limits of the one or more snapshots and to execute hierarchical control of the logical volume when the usage case is a usage case in which the access range of the one or more snapshots is all data and where the logical volume is a volume of a higher priority than the one or more snapshots.

4. The storage apparatus according to claim 1, wherein the controller is configured to determine that the usage case is test or batch processing when the access range to the one or more snapshots is localized data.

5. The storage apparatus according to claim 1, wherein the controller is configured to determine that the usage case is DWH (Data warehouse) when the access range to the one or more snapshots is all data.

6. The storage apparatus according to claim 1, wherein the controller is configured to determine that the usage case is VM clone when the access range to the one or more snapshots is all data, the host mode of the host is VMware, and an XCopy command is received from the host.

7. The storage apparatus according to claim 1, wherein the controller is configured to restore data migrated by hierarchical control processing to a pre-migration configuration location when a load on the one or more snapshots drops and the performance value of the logical volume exceeds the predetermined threshold.

8. A method of controlling a storage apparatus which comprises one or more storage devices configured to provide storage areas; and a controller configured to create a logical volume in the storage area provided by the one or more storage devices and to read and write data from/to the logical volume according to a request from a host, the method comprising:

acquiring, using the controller, one or more snapshots which are data images at certain time points of the logical volume;

determining, using the controller, whether one of the following conditions is met: a performance value of the one or more snapshots exceeds a performance value of the logical volume; or the performance value of the logical volume is below a predetermined threshold;

when one of the conditions is met, predetermined control processing according to usage cases of the one or more snapshots; and determining, using the controller, whether the usage case is a usage case in which an access range of the one or more snapshots is localized data or a usage case in which the access range is all data;

determining, using the controller, whether the logical volume is a usage case of a volume with a higher priority ranking than the one or more snapshots; and executing, using the controller, capacity limits for a cache memory when the usage case is a usage case where the access range of the one or more snapshots is all data and there is parity between the logical volume and the one or more snapshots.

9. A storage apparatus, comprising:

one or more storage devices configured to provide storage areas; and a controller configured to create a logical volume in the storage area provided by the one or more storage devices and to read and write data from/to the logical volume according to a request from a host, wherein the controller is configured to acquire one or more snapshots which are data images at certain time points of the logical volume, wherein the controller is configured to determine whether one of the following conditions is met: a performance value of the one or more snapshots exceeds a performance value of the logical volume; or the performance value of the logical volume is below a predetermined threshold, wherein, when one of the conditions is met, the controller is configured to execute predetermined control processing according to usage cases of the snapshots;

wherein the controller is configured to determine whether the usage case is a usage case in which an access range of the one or more snapshots is localized data or a usage case in which the access range is all data;

wherein the controller is configured to determine that the usage case is VM clone when the access range to the one or more snapshots is all data, the host mode of the host is VMware, and an XCopy command is received from the host.

* * * * *